(12) United States Patent
Honma et al.

(10) Patent No.: US 6,786,961 B2
(45) Date of Patent: Sep. 7, 2004

(54) STABILIZER FOR ASPHALT EMULSION

(75) Inventors: Yuichi Honma, Wakayama (JP); Ryoichi Tamaki, Wakayama (JP); Hirotaka Sasaki, Wakayama (JP)

(73) Assignee: Kao Corporation, Tokyo (JP)

( * ) Notice: Subject to any disclaimer, the term of this patent is extended or adjusted under 35 U.S.C. 154(b) by 12 days.

(21) Appl. No.: 10/276,095
(22) PCT Filed: Aug. 9, 2001
(86) PCT No.: PCT/JP01/06871
§ 371 (c)(1),
(2), (4) Date: Nov. 13, 2002
(87) PCT Pub. No.: WO02/16488
PCT Pub. Date: Feb. 28, 2002

(65) Prior Publication Data
US 2003/0149139 A1 Aug. 7, 2003

(30) Foreign Application Priority Data
Aug. 22, 2000 (JP) ........................................ 2000-250560
May 22, 2001 (JP) ........................................ 2001-152320

(51) Int. Cl.7 .......................... C08I 95/00; C09D 195/00
(52) U.S. Cl. ...................... 106/277; 106/287.22; 516/51
(58) Field of Search ............................ 106/277, 287.22; 516/51

(56) References Cited

U.S. PATENT DOCUMENTS 3,432,320 A    3/1969   Pitchford
3,740,344 A    6/1973   Ferm
5,156,652 A   10/1992   Gregoli et al.
6,114,418 A    9/2000   Isobe et al.

FOREIGN PATENT DOCUMENTS

| EP | 0 507 105 A2 | 10/1992 |
| FR | 2 769 917 A | 4/1999 |
| JP | 47-35059 A | 9/1972 |
| JP | 54-135680 A | 10/1979 |
| JP | 56-8462 A | 1/1981 |
| JP | 56-011965 A | 2/1981 |
| JP | 59 213775 A | 12/1984 |
| JP | 61-078852 A | 4/1986 |
| JP | 63-079826 A | 4/1988 |
| JP | 07-173346 A | 7/1995 |
| JP | 11-116816 A | 4/1999 |

Primary Examiner—David Brunsman
(74) Attorney, Agent, or Firm—Birch, Stewart, Koloasch & Birch, LLP

(57) ABSTRACT

The present invention provides a stabilizer for asphalt emulsion by which asphalt emulsion having a good chemical stability and being excellent in stationary stability and storage stability can be obtained. A polyoxyethylene adduct compound having a terminal group A selected from a $C_{8-22}$ alkyl group etc., a terminal group B selected from $C_{1-4}$ alkyl group etc., and 130 to 500 oxyethylene groups on the average for bonding the terminal groups A and B is used as a stabilizer for asphalt emulsion.

13 Claims, No Drawings

STABILIZER FOR ASPHALT EMULSION

This application is the national phase under 35 U.S.C. §371 of PCT International Application No. PCT/JP01/06871 which has an International filing date of Aug. 9, 2001, which designated the United States of America.

FIELD OF THE INVENTION

The present invention relates to a stabilizer for asphalt emulsion, which can be used along with an emulsifier for emulsifying asphalt thereby improving the stationary stability and storage stability of the resulting asphalt emulsion.

RELATED ARTS

Heretofore, asphalt has been used widely in paved roads, waterproof and adhesive materials, railroads, fuels, etc. However, asphalt has very high viscosity at ordinary temperatures and is thus very poor in workability. To secure desired workability at ordinary temperatures, therefore, there are cases where asphalt is used after its fluidity is improved by conversion into oil-in-water emulsion by use of a suitable emulsifier and water.

The known emulsifier for oil-in-water asphalt emulsion includes an anionic emulsifier, a cationic emulsifier, an amphoteric emulsifier and a nonionic emulsifier, and used depending on the intended use. Among these, the nonionic emulsifier is excellent in chemical stability. That is, the nonionic emulsifier neither forms insoluble salts nor is separated upon contamination with polyvalent metal ions or other impurities contained in asphalt or water or from the outside of the system. Accordingly, if chemical stability is necessary for asphalt emulsion, the nonionic emulsifier is used preferably.

As the nonionic emulsifier, polyoxyethylene alkyl phenyl ethers such as polyoxyethylene nonyl phenyl ether and polyoxyethylene octyl phenyl ether, and polyoxyethylene alkyl ethers, are generally used.

In the technology concerned with asphalt emulsion using a nonionic emulsifier, there is known asphalt emulsion for O/W prime coating using asphalt, a hydrocarbon- or halogenated hydrocarbon-based organic solvent, a cationic emulsifier, a nonionic surfactant having ethylene oxide added to fatty alcohol or alkyl phenol, and water (JP-A 56-8462). Further, an oil-in-water asphalt emulsion using an ethylene oxide-propylene oxide-ethylene oxide block polymer adduct having a $C_{8-22}$ alkyl or alkenyl group (JP-A 11-116816) is known. Further, an oil-in-water emulsion using a nonionic emulsifier having an aryl group or an alkyl aryl group and a polyoxyethylene group or a nonionic emulsifier based on an ethylene oxide-propylene oxide-ethylene oxide block polymer adduct (JP-B 47-35059) is known. In addition, a $C_{10-22}$ alcohol-ethylene oxide adduct (U.S. Pat. No. 3,740,344) is known as a nonionic emulsifier for regulating the curing time of an anionic emulsifier. Further, use of an ethylene oxide-propylene oxide-ethylene oxide block polymer adduct as a surfactant for transporting asphalt emulsion through a low-temperature line (U.S. Pat. No. 5,156,652) is known.

However, these nonionic emulsifiers can satisfy chemical stabilization, but suffer from the problem that when asphalt emulsion to which such nonionic emulsifier was added is left for a long time e.g. a few weeks to several months, the emulsion becomes instable, and the stationary stability and storage stability of the asphalt emulsion are not satisfied at present.

SUMMARY OF THE INVENTION

The object of the present invention is to provide a stabilizer for asphalt emulsion, which has a good chemical stability and is excellent in the stationary stability and storage stability of asphalt emulsion, as well as an asphalt emulsion containing the same.

The co-inventors of the invention have found that a compound having a more average mole number of added oxyalkylene units than a conventional nonionic emulsifier provides an asphalt emulsion, emulsified with an emulsifier, with an improvement in a long stability.

The present invention relates to a stabilizer for asphalt emulsion, comprising a polyoxyethylene adduct compound having:

a terminal group $R^1$ selected from a $C_{8-22}$ straight-chain or branched alkyl group and a $C_{8-22}$ straight-chain or branched alkenyl group, a terminal group $R^2$ selected from a hydrogen atom, a $C_{1-4}$ straight-chain or branched alkyl group and a $C_{1-22}$ straight-chain or branched acyl group, and 130 to 500 oxyethylene groups on the average for bonding the terminal groups $R^1$ and $R^2$ (the stabilizer is referred to hereinafter as stabilizer 1.).

Further, the present invention relates to a stabilizer for asphalt emulsion, comprising a polyoxyalkylene polymer with a weight average molecular weight of 12000 to 30000 containing oxyethylene groups and oxypropylene groups wherein the total molecular weight of the oxyethylene groups accounts for 75% or more of the total molecular weight of the oxyethylene groups and oxypropylene groups (the stabilizer is referred to hereinafter as stabilizer 2.).

Further, the present invention relates to an asphalt emulsifier composition comprising:

stabilizer (I) of the invention described above and a nonionic emulsifier (II) comprising a polyoxyethylene adduct compound having:

a terminal group $R^3$ selected from a $C_{8-22}$ straight-chain or branched alkyl group and a $C_{8-22}$ straight-chain or branched alkenyl group, a terminal group $R^4$ selected from a hydrogen atom, a $C_{1-4}$ straight-chain or branched alkyl group and a $C_{1-22}$ straight-chain or branched acyl group, and 50 to 100 oxyethylene groups on the average for bonding the terminal groups $R^3$ and $R^4$.

Further, the present invention relates to an oil-in-water asphalt emulsion comprising asphalt and the asphalt emulsifier composition of the invention described above.

Further, the present invention relates to roadway comprising asphalt and the asphalt emulsifier composition of the invention described above.

The invention provides use of the polyoxyethylene adduct compound (1) as defined above as a stabilizer for asphalt emulsion, use of the polyoxyalkylene polymer (2) as defined above as a stabilizer for asphalt emulsion, a method of stabilizing asphalt emulsion, comprising mixing it with the polyoxyethylene adduct compound (1) as defined above and a method of stabilizing asphalt emulsion, comprising mixing it with the polyoxyalkylene polymer (2). In the use and method, the above shown emulsifier (II) and a conventional emulsifier may be used.

DETAILED DESCRIPTION OF THE INVENTION

The stabilizer (1) is a polyoxyethylene adduct compound having 130 to 500 on the average, preferably 180 to 500 on the average, more preferably about 200 to 500 oxyethylene groups and can contain about 0 to 10, more preferably 0 to 3 oxypropylene groups. The stabilizer (1) is preferably a compound represented by the formula (1):

$$R^1-O-[(EO)_w^-(PO)_x]-R^2 \quad (1)$$

wherein $R^1$ is a $C_{8-22}$ straight-chain or branched alkyl or alkenyl group, $R^2$ is a hydrogen atom, a $C_{1-4}$ straight-chain or branched alkyl group or a $C_{1-22}$ straight-chain or branched acyl group, EO is an oxyethylene group, PO is an oxypropylene group, $(EO)_w^-$ and $(PO)_x$ may be block or random, and the adding order thereof is not specified; each of W and X is the average number of molecules added, and W=130 to 500, and X=0 to 10.

In the formula (1), $R^1$ is a $C_{8-22}$ straight-chain or branched alkyl or alkenyl group, and from the viewpoint of mixing with cement, it has more preferably 14 to 22 carbon atoms. $R^2$ is a hydrogen atom, a $C_{1-4}$ straight-chain or branched alkyl group or a $C_{1-22}$ straight-chain or branched acyl group, particularly preferably a hydrogen atom from the viewpoint of storage stability. From the viewpoint of emulsifiability, the terminal of $\{(EO)_w^-(PO)_x\}$ of the formula (1) is particularly preferably EO. Further, the number (W) of total EO molecules added is a number of 130 to 500, particularly preferably in the range of 150 to 200 from the viewpoint of storage stability. The number (X) of total PO molecules added is a number of 0 to 10, particularly preferably in the range of 0 to 3 from the viewpoint of storage stability. Further, from the viewpoint of storage stability, the ratio of total EO molecules added/total alkylene oxide groups is preferably W/(W+X)=0.9 or more, particularly preferably 1.0.

The stabilizer (2) comprises a polymer containing oxyethylene groups and oxypropylene groups wherein the total molecular weight of the oxyethylene groups accounts for 75% or more, preferably 75 to 90%, more preferably 75 to 85% of the total molecular weight of the oxyethylene groups and oxypropylene groups. Here, the total molecular weight of oxyethylene groups (or oxypropylene groups) can be calculated from the average number of added molecules as determined by NMR. The polymer is preferably a compound represented by the formula (2):

$$HO-[(EO)_Y^-(PO)_Z]-H \quad (2)$$

wherein EO is an oxyethylene group, PO is an oxypropylene group, and the addition form of EO and PO may be block or random and the adding order thereof is not specified; each of X and Y is the average number of molecules added, and (total molecular weight of EO)/(total molecular weight of EO+total molecular weight of PO)×100=75(%) or more, and simultaneously the total weight average molecular weight is a number of 12000 to 30000.

In the formula (2), the addition form of EO and PO may be block or random, and the adding order thereof is not specified. Each of Y and Z is the average number of molecules added, and from the viewpoint of storage stability, the ratio of the total molecular weight of EO to the total molecular weight of EO and PO, that is, (total molecular weight of EO)/(total molecular weight of EO+total molecular weight of PO)×100 is preferably 75(%) or more, particularly preferably 75 to 90%. Further, each of Y and Z satisfies this condition and simultaneously the total weight average molecular weight is a number of 12000 to 30000, preferably 18000 to 25000.

The content of the stabilizer (1) and (2) in the asphalt emulsion is preferably 0.01 to 5.0% by weight, particularly preferably 0.02 to 3.0% by weight from the viewpoint of storage stability after production of the asphalt emulsion.

The stabilizer (1) and/or (2) can be used in combination with a general asphalt emulsifier. For example, a nonionic emulsifier, an anionic emulsifier, a cationic emulsifier or an amphoteric emulsifier can be used in combination depending on the object. From the viewpoint of chemical stability of the asphalt emulsion, the nonionic emulsifier is particularly preferable.

When the asphalt emulsifier composition is prepared from the stabilizer (1) and/or (2) and the asphalt emulsifier, the content of the stabilizers (1) and (2) is preferably 3 to 50% by weight, particularly preferably 5 to 35% by weight of the emulsifier composition from the viewpoint of storage stability after production of the asphalt emulsion.

The stabilizer (1) and/or (2) (A) and the asphalt emulsifier (B) are mixed preferably in such a ratio that (A)/(B)=1/20 to 1/1 by weight.

When the asphalt emulsifier composition is prepared in the form of an aqueous solution, the total concentration of the stabilizer (1) and/or (2) and the asphalt emulsifier is preferably 0.01 to 10% by weight from the viewpoint of production of the asphalt emulsion. In this case, it is also preferable to satisfy the weight ratio described above.

The nonionic emulsifier includes sorbitan esters, alkylene oxide adducts to a sorbitan ester, ethylene oxide adducts to a long-chain alcohol, ethylene oxide adducts to an alkyl phenol and alkyl glucosides.

The anionic emulsifier includes fatty acids, alkyl sulfates, alkyl ether sulfates, alkyl benzene sulfonic acid, alkyl phosphoric acid or salts thereof.

The cationic emulsifier includes salts of a mineral acid or a lower carboxylic acid with an alkyl amine, an alkyl polyamine, an amide amine or an alkyl imidazoline and quaternary ammonium salts.

The amphoteric emulsifier includes betaine acetate, amide betaine, sulfobetaine, imidazolium betaine and amine oxides.

For the purpose of improving emulsifiability, inorganic salts can also be used in combination. The inorganic salts include sodium chloride, potassium chloride, calcium chloride and aluminum chloride.

When cement is added to aggregates, it is particularly preferable to simultaneously use a nonionic emulsifier (II) comprising a polyoxyethylene adduct compound having:

a terminal group $R^3$ selected from a $C_{8-22}$ straight-chain or branched alkyl group and a $C_{8-22}$ straight-chain or branched alkenyl group, a terminal group $R^4$ selected from a hydrogen atom, a $C_{1-4}$ straight-chain or branched alkyl group and a $C_{1-22}$ straight-chain or branched acyl group, and 50 to 100, preferably about 65 to 100, more preferably about 70 to 100 oxyethylene groups on the average for bonding the terminal groups $R^3$ and $R^4$. The nonionic emulsifier (II) is preferably a nonionic emulsifier represented by the formula (A):

$$R^3-O-[(EO)_a^-(PO)_b]-R^4 \quad (A)$$

wherein $R^3$ is a $C_{8-22}$, preferably $C_{10-18}$, straight-chain or branched alkyl or alkenyl group, $R^4$ is a hydrogen atom, a $C_{1-4}$ straight chain or branched alkyl group or a $C_{1-22}$ straight-chain or branched acyl group, preferably a hydrogen atom; EO is an oxyethylene group, PO is an oxypropylene group, and the addition form of EO and PO may be block or random, and the adding order thereof is not specified; each of a and b is the average number of molecules added, and a=50 to 100, preferably 75 to 100, and b=0 to 10, preferably 0 to 5.

The content of the nonionic emulsifier (II) in the asphalt emulsifier composition is 40 to 97% by weight, particularly preferably 60 to 90% by weight. Further, the content of the nonionic emulsifier (II) in the asphalt emulsion is preferably 0.1 to 5.0%, particularly preferably 0.5 to 3.0% by weight from the viewpoint of mixing with cement.

From the viewpoint of storage stability, the asphalt emulsifier composition preferably comprises a nonionic emulsifier (III) comprising a polyoxyalkylene polymer with a weight average molecular weight of 5000 to 10000 containing oxyethylene groups and oxypropylene groups wherein the total molecular weight of the oxyethylene groups accounts for 75% or more of the total molecular weight of the oxyethylene groups and oxypropylene groups. The nonionic emulsifier (III) is preferably a nonionic emulsifier represented by the formula (B):

$$\text{HO}\text{---}[(\text{EO})_c\text{-}(\text{PO})_d]\text{---}\text{H} \quad \text{(B)}$$

wherein EO is an oxyethylene group, PO is an oxypropylene group, and the addition form of EO and PO may be block or random, and the adding order thereof is not specified; each of c and d is the average number of molecules added, and (total molecular weight of EO)/(total molecular weight of EO+total molecular weight of PO)$\times$100=75(%) or more, preferably 75 to 90%, and simultaneously the total weight average molecular weight is a number of 5000 to 10000, preferably 6000 to 10000.

The content of the nonionic emulsifier (III) in the asphalt emulsifier composition is preferably 1 to 20% by weight, particularly preferably 5 to 15% by weight. The content of the nonionic emulsifier (III) in the asphalt emulsion is preferably 0.01 to 1%, particularly preferably 0.05 to 0.2% by weight from the viewpoint of storage stability of asphalt emulsion.

Further, the ratio of the emulsifier (II) to the stabilizer (1) and (2) by weight is preferably that [stabilizer (1) and (2)]/(II) is 1/20 to 1/1, particularly 1/20 to 1/2.

Further, the ratio of the emulsifier (III) to the stabilizer (1) and (2) by weight is preferably that [stabilizer (1) and (2)]/(III) is 0.01/1 to 5/0.01, particularly 0.1/1 to 5/0.1.

The compounds of the formulae (1), (2), (A), (B), (II) and (III) can be obtained by conventional polymerization addition reaction of alkylene oxides. For production of the compounds (1) and (A), for example, a catalytic amount of an alkaline substance is added to a higher alcohol, and a predetermined amount of ethylene oxide or propylene oxide or a mixture of ethylene oxide and propylene oxide in a predetermined ratio is first subjected to addition reaction in nitrogen atmosphere in an autoclave and then subjected repeatedly to addition reaction with a predetermined amount of ethylene oxide or propylene oxide or a mixture of ethylene oxide and propylene oxide in a predetermined ratio. To form an alkyl or alkenyl group at both terminals, addition of an alkylene oxide is followed by neutralization with an alkaline substance such as NaOH and then etherification with dimethyl sulfate or methyl chloride. To form an ester (acyl group) at one terminal, a saturated or unsaturated fatty acid is added for esterification of the terminal OH. In the case of the formulae (2) and (B), polypropylene glycol is used in place of the higher alcohol of (1) and (A) and a predetermined amount of ethylene oxide and/or propylene oxide is added.

The asphalt used in production of the asphalt emulsion of the present invention includes straight asphalt, cutback asphalt, blown asphalt, semi-blown asphalt, modified asphalt, natural bitumen and regenerated asphalt. The method of producing the emulsion may be any convention alone. For example a mechanical shear force emulsifying method and a phase-transfer method may be used. The emulsifying-machine used in production of the asphalt emulsion of the present invention may be a common machine such as a colloid mill, a Harrell type homogenizer and a line mixer. It may be selected depending on the intended purpose.

The amount of asphalt in the asphalt emulsion is preferably 40 to 80% by weight and the amount of water in the emulsion is preferably 20 to 60% by weight.

For the purpose of regulating the viscosity of the asphalt emulsion, a water-soluble polymer can also be used in combination. The water-soluble polymer includes hydroxyethyl cellulose, carboxymethyl cellulose, methyl cellulose, salts of naphthalene sulfonate-formalin condensate, lignin sulfonates, polyacrylates, gum etc.

The pH value of the asphalt emulsion of the present invention may be acidic, neutral or alkaline and can be selected depending on the intended purpose and compounds to be used in combination.

The asphalt is mixed with aggregates, then formed, tightly hardened and used in pavement thereby to form a roadway. The fluidity is improved by emulsification of asphalt according to the invention. This results in improving its mixing with aggregate such as cement and raising workability at ordinary temperatures and simultaneously providing a roadway having the aggregate uniformly mixed therein.

The stabilizer of the invention has a more average mole number of added oxyalkylene units than the nonionic emulsifier. It can be said that it gets too much more hydrophilic than the optimun for asphalt emulsion. It is for this reason that the stabilizer has a small emulsifying power by itself, but it is combined with an emulsifier to provide the resulting asphalt emulsion advantageously with a long stability. The mechanism of stability will be below shown. It is necessary that the stabilizer has a more average mole number of added oxyalkylene units than the emulsifier to form a water-protective layer, contributed to stability, in which the oxyethylene units spread over the aqueous layer.

The mechanism of stabilization of the asphalt emulsion of the present invention is not elucidated. It is expected that the emulsifier is adsorbed on the surfaces of oil droplets (asphalt particles) to form an emulsion and at the same time the stabilizer is also adsorbed onto the surfaces of oil droplets to form a water-protective layer on the surfaces of oil droplets, in which the oxyethylene units spread over the aqueous layer. That is, it is estimated that alkyl or alkenyl groups of the stabilizer (1) of the present invention are adsorbed onto the surfaces of oil droplets while the chain of 130 to 500 oxyethylene groups on the average spreads over an aqueous layer, thus preventing the oil droplets from associating with each other in order to improve the stability of the oil-in-water emulsion. It is also estimated that oxypropylene groups of the stabilizer (2) of the present invention are adsorbed onto the surfaces of oil droplets while the chain of 130 to 300 oxyethylene groups on the average spreads over an aqueous layer, thus preventing the oil droplets from associating with each other in order to improve the stability of the oil-in-water emulsion. Further, it is estimated that a chain of 50 to 100 oxyethylene groups in the emulsifier (A) is closely oriented on the surface of oil droplets thereby preventing aggregation of the oil droplets. Further, it is estimated that oxypropylene groups in the emulsifier (B) are adsorbed onto the surfaces of oil droplets while its oxyethylene groups spread on an aqueous layer, thus improving emulsifiability to make the oil droplets smaller to further improve the stability of the emulsion.

The embodiments of the present invention include the followings.

(i) An asphalt emulsifier composition comprising the stabilizer (1), the nonionic emulsifier (II) and the nonionic emulsifier (III). In this case, the ratio of the stabilizer (1)/[nonionic emulsifier (II)+nonionic emulsifier (III)] by weight is preferably 1/20 to 1/1, more preferably 1/20 to 1/2, and the ratio of the nonionic emulsifier (II)/nonionic emulsifier (III) is preferably 1/5 to 500/1, more preferably 2/1 to 100/1.

(ii) An asphalt emulsifier composition comprising the stabilizer (2) and the nonionic emulsifier (II). In this case, the ratio of the stabilizer (2)/nonionic emulsifier (II) by weight is preferably 1/20 to 1/1, more preferably 1/20 to 1/2.

(iii) An asphalt emulsifier composition comprising the stabilizer (2), the nonionic emulsifier (II) and the nonionic emulsifier (III). In this case, the ratio of the stabilizer (2)/(nonionic emulsifier (II)+nonionic emulsifier (III)) by weight is preferably 1/20 to 1/1, more preferably 1/20 to 1/2, and the ratio of the nonionic emulsifier (II)/nonionic emulsifier (III) is preferably 1/5 to 500/1, more preferably 2/1 to 100/1.

EXAMPLES

Examples 1 to 31 and Comparative Examples 1 to 10

60 parts by weight of molten asphalt obtained at 145° C. by thermally melting straight asphalt having a rate of penetration of 80 to 100, and 40 parts by weight of an emulsion dissolved in warm water at 55° C. such that the amount of an emulsifier shown in Tables 1 to 5 became 1.2 parts by weight of the final emulsion and the amount of a stabilizer shown in Tables 1 to 5 became 0.1 part by weight of the final emulsion, were passed through a colloid mil to produce an asphalt emulsion.

This asphalt emulsion was measured in terms of evaporation residues as an indicator of storage stability (stationary stability) according to JIS K2208. The storage stability is determined by a difference in evaporation residues between 50 g of the upper and 50 g of the lower of a cylindrical container and is specified to have a value being 1 percent or less of the difference between the upper and the lower after 24 hours. If the difference after 24 hours is more than 1 percent, the tested asphalt emulsion will have a non-uniform concentration of asphalt and therefore have no stable property. The smaller the numerical value is, the higher the stability of emulsion is. The value of 1 or less indicates that the emulsion can be practically used.

Further, sieve test (sifted residues) from this asphalt emulsion was measured according to the method of measuring the sieve test, which is prescribed as to standard in ASTM D2397 and as to testing procedures in D244. The sieve test refers to asphalt solids contained in asphalt emulsion. When an emulsion containing larger solids is transported for a long distance, the asphalt emulsion will be gradually destroyed with the solids as nuclei. For allowing the asphalt emulsion to be usable in pavement on roads even after transportation for a long distance, the content of sifted residues should be 0.1% or less for attaining practical usability as prescribed under the ASTM standards. The smaller the value is, the better results are. Results are shown in Tables 1 to 5.

In Table, the reference to wt. % means a concentration of the asphalt emulsion. The reference to EO % means (total molecular weight of EO)/(total molecular weight of EO+total molecular weight of PO)×100.

TABLE 1

| | | emulsifer | | stabilizer | | asphalt content | storage stability after | sieve |
|---|---|---|---|---|---|---|---|---|
| | | structure | wt. % | structure | wt. % | wt. % | 24 hours | test (%) |
| Example | 1 | RO(EO)$_{50}$H (R:cocoyl) | 1.2 | RO(EO)$_{130}$H (R:stearyl) | 0.1 | 60.5 | 0.9 | 0.06 |
| | 2 | RO(EO)$_{50}$H (R:cocoyl) | 1.2 | RO(EO)$_{200}$H (R:stearyl) | 0.1 | 60.5 | 0.3 | 0.05 |
| | 3 | RO(EO)$_{50}$H (R:cocoyl) | 1.2 | RO(EO)$_{500}$H (R:stearyl) | 0.1 | 60.5 | 0.9 | 0.04 |
| | 4 | RO(EO)$_{50}$H (R:cocoyl) | 1.2 | RO[(PO)$_3$(EO)$_{200}$]H (R:stearyl, added in random) | 0.1 | 60.5 | 0.5 | 0.05 |
| | 5 | RO(EO)$_{50}$H (R:cocoyl) | 1.2 | HO(EO)$_{138}$(PO)$_{56}$(EO)$_{138}$H [EO79%, Mw = 15000, added in block] | 0.1 | 60.5 | 0.9 | 0.05 |
| | 6 | RO(EO)$_{50}$H (R:cocoyl) | 1.2 | HO(EO)$_{164}$(PO)$_{66}$(EO)$_{164}$H [EO79%, Mw = 18000, added in block] | 0.1 | 60.5 | 0.3 | 0.04 |
| | 7 | RO(EO)$_{50}$H (R:stearyl) | 1.2 | RO(EO)$_{200}$H (R:stearyl) | 0.1 | 60.5 | 0.3 | 0.05 |
| | 8 | RO(EO)$_{50}$H (R:nonylphenyl) | 1.2 | RO(EO)$_{200}$H (R:stearyl) | 0.1 | 60.5 | 0.3 | 0.05 |
| | 9 | RO(EO)$_{50}$H (R:cocoyl) | 1.2 | RO(EO)$_{200}$H (R:cocoyl) | 0.1 | 60.5 | 0.6 | 0.05 |
| | 10 | RO(EO)$_{50}$H (R:cocoyl) | 1.2 | RO(EO)$_{200}$H (R:nonylphenyl) | 0.1 | 60.5 | 0.4 | 0.04 |
| | 11 | RO(EO)$_{50}$H(R:cocoyl) HO(EO)$_{70}$(PO)$_{30}$(EO)$_{70}$H [EO78%, Mw = 8000, added in block] | 1.1 0.1 | RO(EO)$_{200}$H (R:stearyl) | 0.1 | 60.5 | 0.2 | 0.03 |

(note) the weight percent shows a contentin the asphalt emulsion (applied hereinafter)

TABLE 2

| | | emulsifier | | stabilizer | | asphalt content wt. % | storage stability after 24 hours | sieve test (%) |
|---|---|---|---|---|---|---|---|---|
| | | structure | wt. % | structure | wt. % | | | |
| Example | 12 | RO(EO)$_{50}$H (R:cocoyl) HO(EO)$_{70}$(PO)$_{30}$(EO)$_{70}$H [EO78%, Mw = 8000, added in block] | 1.1 0.1 | HO(EO)$_{164}$(PO)$_{66}$(EO)$_{164}$H [EO79%, Mw = 18000, added in block] | 0.1 | 60.5 | 0.2 | 0.03 |
| | 13 | RO(EO)$_{50}$H (R:cocoyl) | 1.2 | RO(EO)$_{200}$H (R:stearyl) | 0.1 | 60.5 | 0.6 | 0.05 |
| | 14 | RO(EO)$_{50}$H (R:cocoyl) | 1.2 | RO(EO)$_{200}$H (R:stearyl) | 0.1 | 60.5 | 0.9 | 0.05 |
| control | 1 | RO(EO)$_{50}$H (R:nonylphenyl) | 1.2 | — | — | 60.5 | 3.8 | 0.06 |
| | 2 | RO(EO)$_{50}$H (Rcocoyl) | 1.2 | RO(EO)$_{50}$H (R:stearyl) | 0.1 | 60.5 | 2.0 | 0.05 |
| | 3 | RO(EO)$_{50}$H (R:cocoyl) | 1.2 | RO(EO)$_{600}$H (R:stearyl) | 0.1 | 60.5 | 1.4 | 0.04 |
| | 4 | RO(EO)$_{50}$H (Rcocoyl) | 1.2 | HO(EO)$_{70}$(PO)$_{70}$(EO)$_{70}$H [EO60%, Mw = 10000, added in block] | 0.1 | 60.5 | 2.8 | 0.05 |

TABLE 3

| | | emulsfier | | stabilizer | | asphalt content wt. % | storage stability after 24 hours | sieve test (%) |
|---|---|---|---|---|---|---|---|---|
| | | structure | wt. % | structure | wt. % | | | |
| Example | 15 | RO(EO)$_{85}$H (Rcocoyl) | 1.2 | RO(EO)$_{130}$H (R:stearyl) | 0.1 | 60.5 | 0.8 | 0.03 |
| | 16 | RO(EO)$_{85}$H (R:cocoyl) | 1.2 | RO(EO)$_{200}$H (R:stearyl) | 0.1 | 60.5 | 0.2 | 0.02 |
| | 17 | RO(EO)$_{85}$H (R:cocoyl) | 1.2 | RO(EO)$_{500}$H (R:stearyl) | 0.1 | 60.5 | 0.8 | 0.02 |
| | 18 | RO(EO)$_{85}$H (R:cocoyl) | 1.2 | RO[(PO)$_3$(EO)$_{200}$]H (R:stearyl, added in random) | 0.1 | 60.5 | 0.5 | 0.02 |
| | 19 | RO(EO)$_{85}$H (R:cocoyl) | 1.2 | HO(EO)$_{138}$(PO)$_{56}$(EO)$_{138}$H [EO79%, Mw = 15000 added in block] | 0.1 | 60.5 | 0.7 | 0.01 |
| | 20 | RO(EO)$_{85}$H (R:cocoyl) | 1.2 | HO(EO)$_{164}$(PO)$_{66}$(EO)$_{164}$H [EO79%, Mw = 18000, added in block] | 0.1 | 60.5 | 0.2 | 0.02 |
| | 21 | RO(EO)$_{85}$H (Rcocoyl) | 1.2 | RO(EO)$_{200}$H (R:stearyl) | 0.1 | 60.5 | 0.3 | 0.02 |
| | 22 | RO(EO)$_{85}$H (R:cocoyl) | 1.2 | RO(EO)$_{200}$H (R:stearyl) | 0.1 | 60.5 | 0.3 | 0.01 |
| | 23 | RO(EO)$_{85}$H (R:nonylphenyl) | 1.2 | RO(EO)$_{200}$H (R:cocoyl) | 0.1 | 60.5 | 0.6 | 0.01 |
| | 24 | RO(EO)$_{85}$H (R:cocoyl) | 1.2 | RO(EO)$_{200}$H (R:nonylphenyl) | 0.1 | 60.5 | 0.3 | 0.01 |
| | 25 | RO(EO)$_{85}$H (R:cocoyl) HO(EO)70(PO)30(EO)70H [EO78%, Mw = 8000, added in block] | 1.1 0.1 | RO(EO)$_{200}$H (R:stearyl) | 0.1 | 60.5 | 0.2 | 0.02 |

TABLE 4

| | | emulsifier | | stabilizer | | asphalt content wt. % | storage stability after 24 hours | sieve test (%) |
|---|---|---|---|---|---|---|---|---|
| | | structure | wt. % | structure | wt. % | | | |
| example | 26 | RO(EO)$_{85}$H (R:cocoyl) HO(EO)$_{70}$(PO)$_{30}$(EO)$_{70}$H [EO78%, Mw = 8000, added in block] | 1.1 0.1 | HO(EO)$_{164}$(PO)$_{66}$(EO)$_{164}$H [EO79%, Mw = 18000, added in block] | 0.1 | 60.5 | 0.2 | 0.02 |
| | 27 | RO(EO)$_{85}$H (R:cocoyl) | 1.2 | RO(EO)$_{200}$H (R:stearyl) | 0.1 | 60.5 | 0.5 | 0.03 |
| | 28 | RO(EO)$_{85}$H (R:cocoyl) | 1.2 | RO(EO)$_{200}$H (R:stearyl) | 0.1 | 60.5 | 0.8 | 0.01 |
| control | 5 | RO(EO)$_{85}$H (R:nonylphenyl) | 1.2 | — | — | 60.5 | 2.6 | 0.03 |
| | 6 | RO(EO)$_{85}$H (R:cocoyl) | 1.2 | RO(EO)$_{50}$H (R:stearyl) | 0.1 | 60.5 | 1.5 | 0.02 |
| | 7 | RO(EO)$_{85}$H (R:cocoyl) | 1.2 | RO(EO)$_{600}$H (R:stearyl) | 0.1 | 60.5 | 1.1 | 0.01 |
| | 8 | RO(EO)$_{85}$H (R:cocoyl) | 1.2 | HO(EO)$_{70}$(PO)$_{70}$(EO)$_{70}$H [EO60%, Mw = 10000, added in block] | 0.1 | 60.5 | 1.8 | 0.01 |
| | 9 | HO(EO)$_{70}$(PO)$_{30}$(EO)$_{70}$H [EO78%, Mw = 8000, added in block] | 1.2 | — | — | 60.5 | 3.0 | 0.3 |

TABLE 5

| | | emulsifer | | stabilizeer | | asphalt content | storage stability after | sieve |
|---|---|---|---|---|---|---|---|---|
| | | structure | wt. % | structure | wt. % | wt. % | 24 hours | test (%) |
| Example | 29 | $RO(EO)_{85}H$ (R:cocoyl)<br>$HO(EO)_{70}(PO)_{30}(EO)_{70}H$<br>[EO78%, Mw = 8000, added in block]<br>$R-(NHCH_2CH_2CH_2)_3-NH_2$<br>(R:cocoyl) | 1.1<br>0.1<br><br>0.1 | $RO(EO)_{200}H$ (R:stearyl) | 0.1 | 60.5 | 0.2 | 0.03 |
| | 30 | $RO(EO)_{85}H$ (R:cocoyl)<br>$HO(EO)_{70}(PO)_{30}(EO)_{70}H$<br>[EO78%, Mw = 8000, added in block]<br>sodiuim lignin sulfonate (Mw = 10000) | 1.1<br>0.1<br><br>0.1 | $RO(EO)_{200}H$ (R:stearyl) | 0.1 | 60.5 | 0.2 | 0.04 |
| | 31 | $RO(EO)_{85}H$ (R:cocoyl)<br>$HO(EO)_{70}(PO)_{30}(EO)_{70}H$<br>[EO78%, Mw = 8000, added in block]<br>kraft lignin (Mw = 10000) | 1.1<br>0.1<br><br>0.1 | $RO(EO)_{200}H$ (R:stearyl) | 0.1 | 60.5 | 0.2 | 0.03 |
| control | 10 | $RO(EO)_{85}H$ (R:cocoyl) | 1.2 | $R(EO)_{164}(PO)_{66}(EO)_{164}H$<br>[EO79%, Mw = 18000,<br>added in block] | 0.1 | 60.5 | 3.8 | 0.06 |

What is claimed is:

1. A stabilizer for asphalt emulsion, comprising a polyoxyethylene adduct compound (1) having:
   a terminal group $R^1$ selected from a $C_{8-22}$ straight-chain or branched alkyl group and a $C_{8-22}$ straight-chain or branched alkenyl group,
   a terminal group $R^2$ selected from a hydrogen atom, a $C_{1-4}$ straight-chain or branched alkyl group and a $C_{1-22}$ straight-chain or branched acyl group, and
   130 to 500 oxyethylene groups on the average for bonding the terminal groups $R^1$ and $R^2$.

2. A stabilizer for asphalt emulsion, comprising a polyoxyalkylene polymer (2) with a weight average molecular weight of 12000 to 30000 containing oxyethylene groups and oxypropylene groups wherein the total molecular weight of the oxyethylene groups accounts for 75% or more of the total molecular weight of the oxyethylene groups and oxypropylene groups.

3. An asphalt emulsifier composition comprising:
   the stabilizer (I) according to claim 1 or 2 and
   a nonionic emulsifier (II) comprising a polyoxyethylene adduct compound having:
   a terminal group $R^3$ selected from a $C_{8-22}$ straight-chain or branched alkyl group and a $C_{8-22}$ straight-chain or branched alkenyl group,
   a terminal group $R^4$ selected from a hydrogen atom, a $C_{1-4}$ straight-chain or branched alkyl group and a $C_{1-22}$ straight-chain or branched acyl group, and
   50 to 100 oxyethylene groups on the average for bonding the terminal groups $R^3$ and $R^4$.

4. An asphalt emulsifier composition according to claim 3, which further comprises a nonionic emulsifier (III) comprising a polyoxyalkylene polymer with a weight average molecular weight of 5000 to 10000 containing oxyethylene groups and oxypropylene groups wherein the total molecular weight of the oxyethylene groups accounts for 75% or more of the total molecular weight of the oxyethylene groups and oxypropylene groups.

5. The composition according to claim 4, in which the stabilizer is (1), the ratio of the stabilizer (1)/[nonionic emulsifier (II)+nonionic emulsifier (III)] by weight is preferably 1/20 to 1/1 and the ratio of the nonionic emulsifier (II)/the nonionic emulsifier (III) is 1/5 to 500/1.

6. The composition according to claim 4, in which the stabilizer is (2), the ratio of the stabilizer (2)/[nonionic emulsifier (II)+nonionic emulsifier (III)] by weight is 1/20 to 1/1 and the ratio of the nonionic emulsifier (II)/nonionic emulsifier (III) is 1/5 to 500/1.

7. An oil-in-water asphalt emulsion comprising asphalt and the emulsifier composition according to claim 3.

8. A roadway comprising asphalt and the emulsifier composition according to claim 3.

9. The composition according to claim 3, in which the stabilizer is (2) and the ratio of the stabilizer (2)/the nonionic emulsifier (II) by weight is 1/20 to 1/1.

10. A method of stabilizing asphalt emulsion, comprising mixing it with the polyoxyethylene adduct compound (1) as defined in claim 1.

11. A stabilized asphalt emulsion comprising the polyoxyethylene adduct compound (1) as defined in claim 1.

12. A method of stabilizing asphalt emulsion, comprising mixing it with the polyoxyalkylene polymer (2) as defined in claim 2.

13. A stabilized asphalt emulsion comprising the polyoxyalkylene polymer (2) as defined in claim 2.

* * * * *